July 13, 1948. J. H. KEEGAN 2,445,272
RECORDING INSTRUMENT HAVING PLURAL PENS
AND AN OSCILLATING ACTUATOR
Filed Dec. 15, 1944 2 Sheets-Sheet 1

INVENTOR.
JAMES H. KEEGAN

BY
*C. B. Spangenberg*
ATTORNEY.

July 13, 1948.                J. H. KEEGAN                 2,445,272
              RECORDING INSTRUMENT HAVING PLURAL PENS
                     AND AN OSCILLATING ACTUATOR
Filed Dec. 15, 1944.                                 2 Sheets-Sheet 2
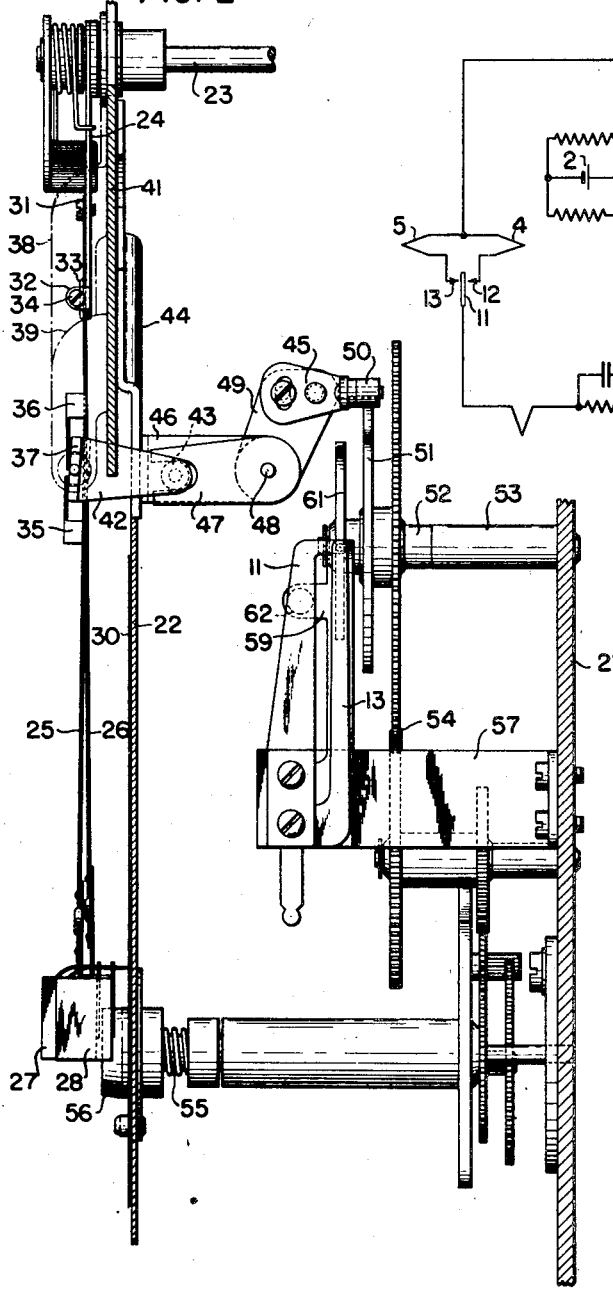
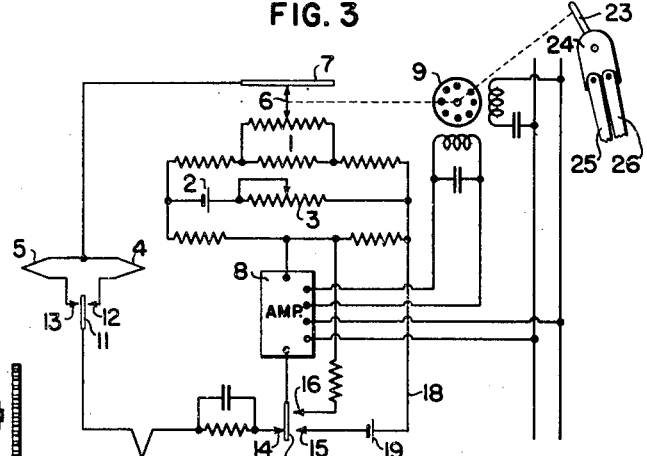
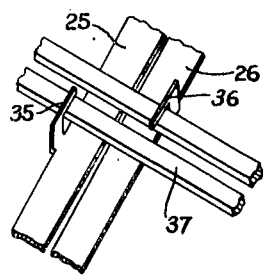
*INVENTOR.*
JAMES H. KEEGAN
BY
*E. B. Spangenberg*
ATTORNEY.

Patented July 13, 1948

2,445,272

UNITED STATES PATENT OFFICE 2,445,272

RECORDING INSTRUMENT HAVING PLURAL PENS AND AN OSCILLATING ACTUATOR

James H. Keegan, North Wales, Pa., assignor to The Brown Instrument Company, Philadelphia, Pa., a corporation of Pennsylvania Application December 15, 1944, Serial No. 568,257

6 Claims. (Cl. 346—49)

The present invention relates to recording instruments and more particularly to a recording instrument of the type in which a plurality of records may be made on a single chart by the use of a single measuring system.

It is an object of the present invention to provide a recording instrument in which a single measuring system is sequentially connected to a plurality of conditions responsive elements. The measuring system is used to move an arm to positions corresponding to the value of the condition then being measured. As the arm moves it carries a plurality of pen arms, one for each responsive element, across a chart with one or another of the pens carried by the pen arms in engagement with the chart to make a record of the value of the condition thereon. Means is provided to hold the pens in a position above the chart and to move one of the pens into engagement therewith, depending upon which of the responsive elements is connected to the measuring system.

It is a further object of the invention to provide a member that moves in response to variations in the value of a condition which member carries a plurality of marking elements, only one of which is used at a time.

It is a further object of the invention to provide a simple and efficient means for moving one or another of a plurality of marking elements that are carried by a single movable member into engagement with a chart upon which a record is to be made.

The various features of novelty which characterize this invention are pointed out with particularity in the claims annexed to and forming a part of this specification. For a better understanding of the invention, however, its advantages and specific objects obtained with its name, reference should be had to the accompanying drawings and descriptive matter in which is illustrated and described a preferred embodiment of the invention.

In the drawings:

Figure 2 is a view taken partly in section on line 2—2 of Figure 1;

Figure 3 is a diagrammatic wiring diagram of a potentiometer circuit, and

Figure 4 is a perspective view of a portion of the pen lifting mechanism.

Figure 1:
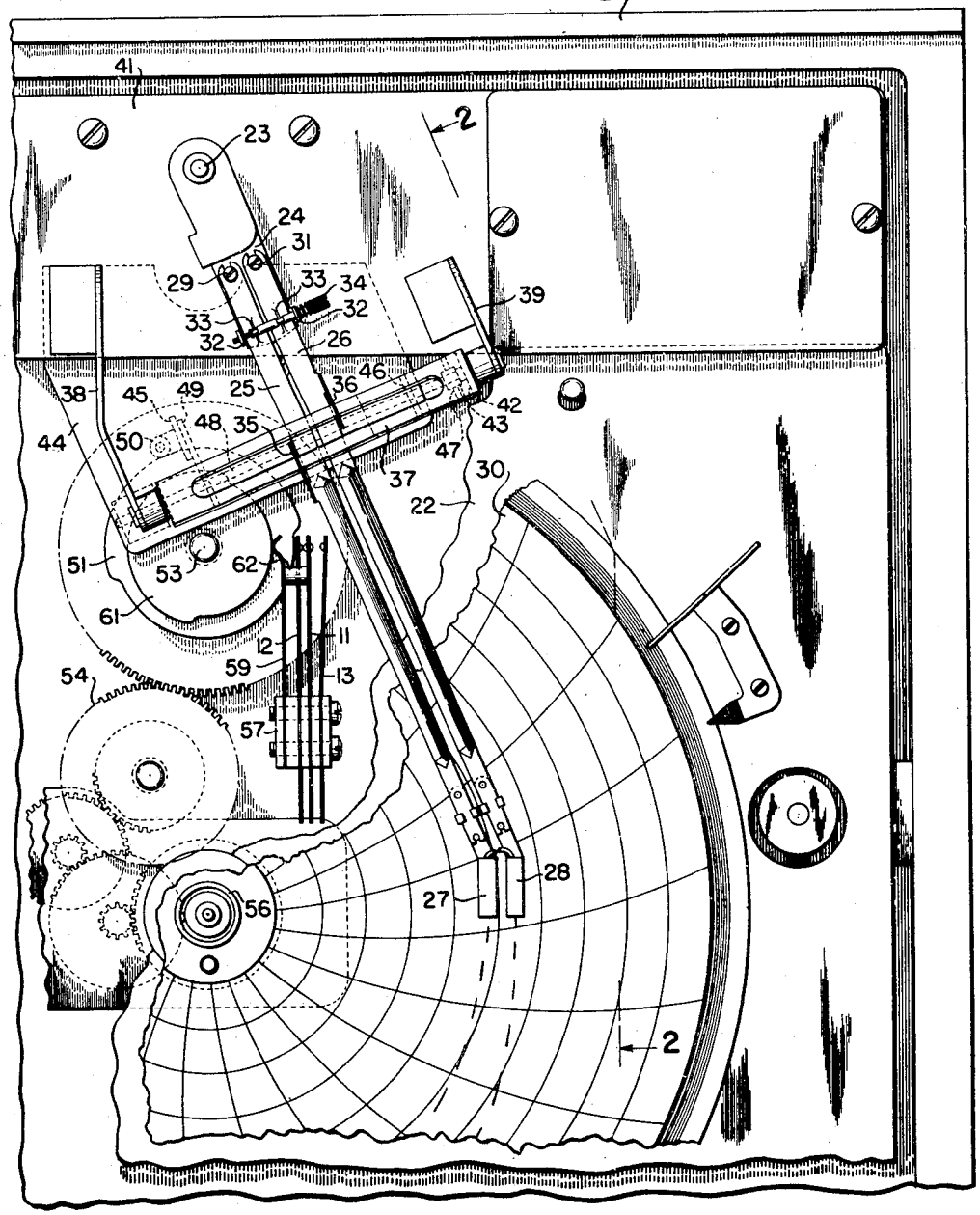
Figure 1 is a front view of the instrument with certain parts broken away to show more clearly other parts.

Referring first to Figure 3 there is shown a typical potentiometer circuit in which there is a slide wire 1 that has a potential impressed across it by a battery 2 to produce a voltage drop, the battery preferably being in the form of a dry cell. Connected in circuit with the battery is a variable resistance 3 that is used to maintain constant the potential drop in the circuit as the battery diminishes in power in order to keep the system in calibration. The voltage from one or another of a plurality of thermocouples 4 and 5 is impressed across a portion of the slide wire 1 as determined by the position of a contact 6 along the slide wire and a parallel collector bar 7. As the temperature of the thermocouple which is then in the circuit changes, the potentiometer circuit will become unbalanced, and this in turn is detected by a vibrator and amplifier 8 to energize a motor 9 to shift the contact 6 along the slide wire in the proper direction and amount in order to rebalance the potentiometer circuit. The details of the vibrator and amplifier are disclosed in the co-pending application of Walter P. Wills, Serial No. 421,173, and which was filed on December 1, 1941 (now Patent 2,423,540, granted July 8, 1947).

One or the other of the thermocouples 4 and 5 may be connected in this circuit by movement of a contact 11 of a thermocouple switch into engagement with either contact 12 or 13 respectively. The leaf 11 of this switch is connected by a wire to another switch which consists of a movable contact 17 that is connected to the amplier and a stationary contact 14 on the end of the wire. This switch is also provided with a stationary contact 15 that is connected to the potentiometer network and a stationary contact 16 which is used to insert a shunt resistance around the amplifier at such times as the potentiometer circuit is being standardized. In a wire 18 between the contact 15 and the potentiometer network there is located a standard cell 19 which is used to impress a standard potential across a portion of the potentiometer network at such times as the network is being recalibrated or standardized.

In the operation of the potentiometer network of the type disclosed above, upon the occurrence of a change in temperature of a thermocouple, the potentiometer circuit will be unbalanced to produce a current flow in one direction or in the other through a vibrator which is included along with the amplifier and designated at 8. The vibrator and amplifier will detect this unbalance, its direction and amount, and correspondingly energize the motor 9 for rotation in the proper direction. This motor is mechanically connected in a suitable manner with the contact 6 so that the latter is shifted along the slide wire 1 and collector 7 to a position in which the potentiometer circuit is again balanced and no current flows through the unit 8. Means to be described below are provided to periodically move the switch leaf 11 into engagement with the contact 12 or contact 13 so that the instrument will periodically and alternately measure the temperature of thermocouples 4 and 5.

The potentiometer mechanism which has been described is mounted in a casing 21 and is protected in the front by a chart plate 22 that is detachably fastened to the casing. This chart plate 22 is shown as being broken away in order that the details of certain mechanism located behind the chart plate may be better shown.

The motor 9 that is used to move the contact 6 along the slide wire 1 and the collector bar 7 also serves to rotate a shaft 23 an amount proportional to the position of the contact. Mounted on the shaft 23 and movable therewith is a supporting member 24 upon which a pair of pen arms 25 and 26 are mounted. These arms have on their lower ends respectively pens 27 and 28 which may be filled with different colored inks so that the records made by these pens on a chart 30 may be readily distinguished. In order to obtain an accurate zero adjustment the pen arms may be adjusted slightly with respect to the support 24. To this end the pen arms are pivoted at 29 and 31 respectively on the member 24 and each of the pen arms is provided with an upstanding projection 33. The lower end of the member 24 has wings 32 formed on it which project upwardly and receive a screw 34. As is best shown in Figure 1 this screw is provided with reduced portions that receive the projections 33 on the pen arms. Therefore as the screw 34 is rotated in the wings 32, it will be moved with respect to these wings, and its reduced portion will simultaneously move the pen arms around their pivots.

In making the records of the temperature of the thermocouples 4 and 5 first one pen arm is kept out of engagement with the chart while the other one is making a record and vice versa. The pen arms may be so arranged that the pens normally engage the chart and are at times moved away therefrom, or they may normally be out of engagement with the chart and at times be moved into engagement therewith. This being purely a matter of preference, the operation is the same. To accomplish this operation the pen arm 25 is provided with a hook 35 and the pen arm 26 is provided with a hook 36 by means of which they may be moved. Extending across the front of the instrument and received by these hooks is a bar 37 that is pivotally supported at its left end by a bearing member 38 and in its right end by a bearing member 39. These members are supported at their upper ends on a plate 41 that is suitably attached to the instrument casing, which plate also serves as a bearing for the front end of shaft 23. In order to raise one or the other of the pens from the chart, the bar 37 is tilted as is best shown in Figure 2 so that its lower or its upper edge will engage one of the hooks 35 or 36 to raise that hook and its corresponding pen arm. If the pens are biased toward the chart the bar 37 will engage the hooks to lift the pen arms enough to lift the pens from engagement with the chart. Tilting movement of the bar 37 is accomplished by having an arm 42 attached to the bar 37 and projecting from the rear face thereof. This arm is provided with a pin 43 which may be raised or lowered to tilt the bar.

Attached to the rear of plate 41, and as best shown in Figure 2, is a supporting plate 44. This plate has mounted on it bearings 46 that support a shaft 48 to which a lever 47 is attached. This lever is provided with a slot in its front end that receives the pin 43 on arm 42. The other end of shaft 48 has attached to it an arm 49. Adjustably fastened to the arm 49 is a part 45 that has a cam following roller 50 projecting from its end into a position to ride on the surface of a cam 51. In order that the cam may be mounted for rotation in the instrument, it is attached to a hub 52 that is rotatably supported on a stud shaft 53 projecting forwardly from the rear wall of casing 21. The cam is rotated at a suitable rate of speed by means of gearing 54 from a conventional clock motor. This gearing also serves to rotate a shaft 55 upon which is mounted a hub 56 for the chart 30 upon which the records are made.

The thermocouple switch comprising the contacts 11, 12, and 13 is preferably made in the form of a conventional leaf switch, each leaf of which carries a contact and is insulated from the other, and all of which are mounted on a support 57 that is also attached to the rear face of the casing by means of suitable screws. The switch is also provided with an actuating leaf 59 that is normally biased, as shown in Figure 1, into engagement with the periphery of a cam 61 that is also attached to the hub 52. The switch is so formed that contacts 11 and 12 are normally in engagement with each other, but as the actuating leaf 59 is moved to the right by the cam 61 it acts through a button 62 to move the contact 11 to the right to close conacts 11 and 13 and open contacts 11 and 12.

In the operation of the device, as the temperature of the thermocouple then connected in the measuring circuit varies the motor 9 will be energized for rotation in the proper direction to move contact 6 and re-balance the potentiometer circuit. This same movement will rotate the shaft 23 to move both pen arms across the chart. Depending upon the position of the cam 51, the bar 37 will be tilted either clockwise or counterclockwise from its vertical position so that either its lower edge will lift the pen arm 25 and move pen 27 from the chart or its upper edge will lift the pen arm 26 to move the pen 28 above the chart. The cams 51 and 61 are so related to each other that when the thermocouple 4 is connected in the potentiometer circuit, the bar 37 will be moved to the position shown in Figure 2 so that pen 28 is in engagement with the chart. As the cams rotate in a clockwise direction the roller 50 will move down from the high portion to the lower portion of cam 51 permitting lever 47 to rotate in a clockwise direction to rotate bar 37 in a counter-clockwise direction. This lifts the pen 28 from the chart and permits the pen 27 to move into engagement with the chart. Simultaneously the cam 61 will have rotated to a position in which the leaf 59 is moved from the position shown to the right to open the contacts 12 and 11 and close contacts 11 and 13, thereby disconnecting thermocouple 4 from the potentiometer circuit and connecting the thermocouple 5 in its place. The speed of rotation of cams 51 and 61 will be such that the instrument will be connected to each thermocouple for a sufficient length of time for a legible record to be made upon the chart. Each record will, of course, be a series of dashes of a length depending upon the time the pen is in engagement with the chart. These dash lines, however, are sufficient to show any change in the temperature being measured and may be readily followed by anyone examining the chart. Since the records are made in different colored inks they are readily distinguishable even though they may be close together or move across one another during the time the instrument is in operation.

From the above description it will be seen that I have made a recording instrument in which a single measuring circuit may be used to record upon a circular chart the values of more than one variable condition. By using a single measuring mechanism and keeping one or the other of a pair of pens in engagement with the chart, the instrument is given a wider field of usage than would be possible if it were designed to record only a single value. It will also be seen that the mechanism by which the thermocouple switching and the pen lifting is accomplished is simple and straight forward in its operation.

While in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is:

1. In a recording instrument having a chart upon which a plurality of records are to be made, the combination of a member, means to move said member through a path to positions corresponding to the value of one or another of a plurality of variable conditions, a plurality of marking elements, an arm attached to said member to support each marking element, said arms being biased to move said marking elements into engagement with said chart, a control bar extending adjacent said arms throughout their path of travel, cooperating means between said bar and said arms, and means to move said control bar and, through said cooperating means, said arms to move one or another of said marking elements out of engagement with the chart.

2. In a recording instrument having a chart upon which a record is to be made, the combination of a movable member, a plurality of arms attached to said member and extending over the chart, a marking element attached to each of said arms and normally biased towards said chart, and means acting on said arms to move individually said arms and thereby bring said marking element on said arm into engagement with the chart whereby a single record at a time may be made on the chart by said marking element.

3. In a recording instrument having a chart upon which a record is to be made, the combination of a member movable in response to the value of a variable condition, a pair of arms attached to said member and extending over said chart, a marking member attached to each arm, said marking members normally being in engagement with said chart, a control bar extending adjacent said arms, hook means connecting each arm with said control bar and being so arranged that said arms can move along said control bar, and means to tilt said control bar in either direction from a neutral position to bring one or the other of said marking elements out of engagement with the chart.

4. In a recording instrument having a chart upon which a plurality of records are to be made, the combination of a measuring system, a plurality of elements each responsive to the variations in a condition, means to connect sequentially said elements to said measuring system, a member, means operated by said measuring system to move said member to positions corresponding to the value of the condition to which the element then connected to said measuring system is subjected, a plurality of pens equal in number to the number of said elements, an arm for each pen attached side by side to said member in a manner to place said pens in engagement with the chart, means to move one arm only and thereby lift one pen at a time out of engagement with the chart, and mechanism to operate said means-to-connect and to operate said means-to-move in synchronism whereby a given pen will engage the chart when a given element is connected to said measuring system.

5. In a recording instrument having a chart upon which a plurality of records are made, the combination of a member movable to various positions depending upon the value of a condition being measured, a pair of marking elements operative to make records upon the chart, a pair of resilient arms attached side by side to said member, to support said marking elements, and means to bend individually said arms to move one or the other to said marking elements out of engagement with the chart.

6. In a recording instrument having a chart upon which a plurality of records are made, the combination of a member movable to various positions depending upon the value of a condition being measured, a pair of marking elements operative to make records upon the chart, a pair of resilient arms attached side by side to said member, to support said marking elements, a hook member formed on each arm, a bar extending along the path of movement of said arms and engaged by said hook members, said bar having a normal position, and means to tilt said bar to move one or the other of said marking elements out of engagement with said chart.

JAMES H. KEEGAN.

REFERENCES CITED

The following references are of record in the file of this patent:

UNITED STATES PATENTS

| Number | Name | Date |
|---|---|---|
| 746,865 | Myers | Dec. 15, 1903 |
| 827,086 | Darwin | July 31, 1906 |
| 1,211,703 | Hess | Jan. 9, 1917 |
| 1,350,174 | Norwood et al. | Aug. 17, 1920 |
| 2,125,345 | Hunt | Aug. 2, 1938 |